3,362,279
SHEET METAL SCREW-RECEIVING FASTENER

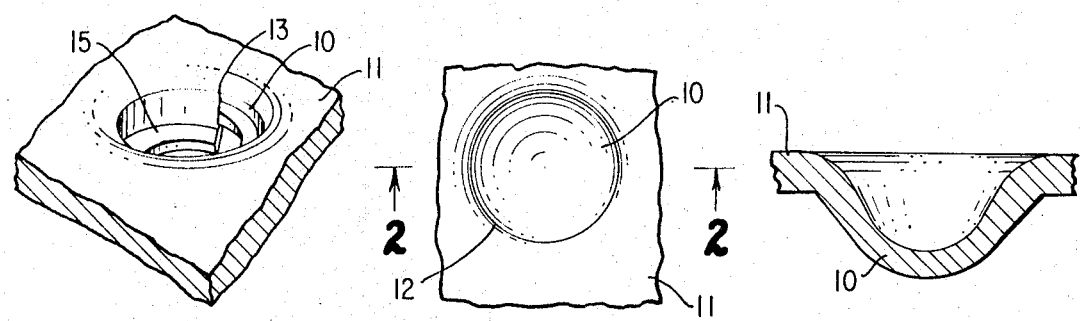
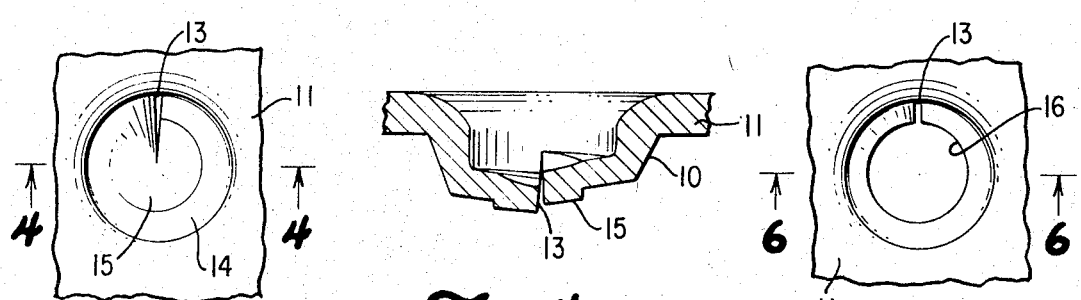
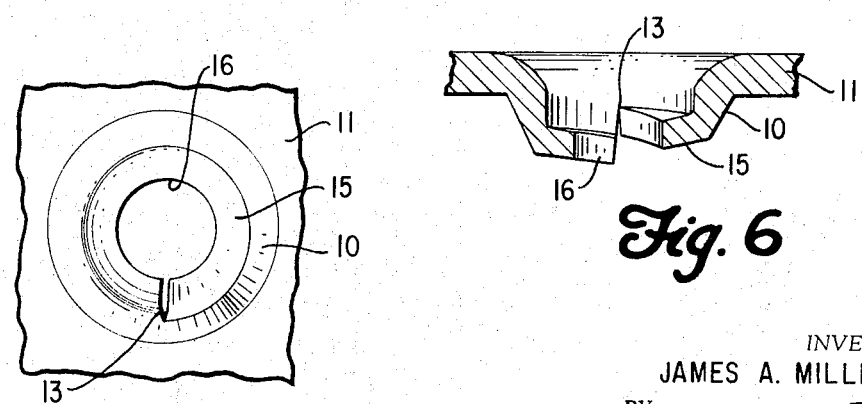

James A. Miller, Rossford, Ohio, assignor to The Bishop and Babcock Corporation, Toledo, Ohio, a corporation of Ohio
Filed Oct. 21, 1965, Ser. No. 500,422
1 Claim. (Cl. 85—32)

ABSTRACT OF THE DISCLOSURE

A sheet metal nut having a frusto-conical protuberance with a screw receiving aperture at one end thereof. The screw receiving aperture is interrupted by a single slit 13, has a helical edge, which is thinner than the gage of the sheet material from which the nut is made.

---

This invention relates to sheet metal structures for self-locking threaded engagement by a screw and methods of making same.

An object is to produce a novel method of forming a sheet metal screw-receiving fastener which comprises unique steps so designed that the roundness of the hole through which the screw extends can be predetermined, as can also the size of the hole.

Another object is to produce a new and improved method of making screw-receiving fasteners of sheet metal, the steps of which are reduced to a minimum and in which sheet metal of somewhat greater thickness than would normally fit the screw intended for the fastener can be employed.

A further object is to produce a method of making screw-receiving fasteners of sheet metal which is simple in operation, employing a minimum number of steps; is such as to achieve uniformity of product on a quantity production basis; enables the use of different gauges of sheet metal irrespective of the size of the threads of the screw intended for the fastener; and achieves at all times a screw-receiving hole which is not only of uniform roundness but is exactly of the desired size.

A still further object is to produce a sheet metal screw-receiving fastener which is so designed as to have increased strength and torsional resistance.

According to one aspect of this invention a radial slit is made in the second step from an imperforate cone in the sheet metal but no metal is removed. Removal of metal is accomplished in the final step so that a hole of the desired roundness and size in each instance can be secured. Thus, contrary to previous methods, this invention achieves uniformity in an extremely simple and efficient manner and makes possible the use of thicker metal for a given screw size than was heretofore contemplated.

Further objects and advantages of the invention will hereinafter appear, and, for purposes of illustration but not of limitation, an embodiment of the invention is shown on the accompanying drawings, in which FIGURE 1 is a top plan view of a fragment of sheet metal in which a protuberance has been pressed from the surface of the metal and constituting the first step in the formation of the fastener;

FIGURE 2 is an inverted sectional view on the line 2—2 of FIGURE 1;

FIGURE 3 is a top plan view of the fastener after the second step has been performed, in which a radial slit has been made and the metal has been coined in helical fashion from one side of the slit to the other;

FIGURE 4 is an inverted sectional view on the line 4—4 of FIGURE 3;

FIGURE 5 is a bottom plan view of the fastener at the conclusion of the third and final step in which a central hole has been punched by removing a portion of the metal;

FIGURE 6 is a sectional view on the line 6—6 of FIGURE 5;

FIGURE 7 is an enlarged top plan view of the finished fastener; and

FIGURE 8 is a bottom perspective view of the finished fastener.

In the method illustrated, a conical protuberance 10 is pressed or bumped from the surface of a sheet metal plate 11 to the desired height of the intended fastener. The base 12 of the protuberance is circular and the sides uniformly incline to the top of the protuberance which is rounded. Thus the protuberance is imperforate with a circular base integral with the plate 11. The angularity of the protuberance is in the form of a gentle slope, such as is required in the fastener to attain adequate strength. Angularity between twenty and sixty degrees may be chosen for this purpose depending upon the size of the ultimate fastener and the strength required.

The next step consists of radially slitting the protuberance 10 from the top down to a point spaced above the base substantially as indicated at 13 on FIGURE 4, thereby providing a substantially frusto-conical base portion the circumference of which is imperforate. At the same time slitting of the protuberance 10 takes place the protuberance is coined or pressed to the extent that the metal is thinned or flattened in a helical path from one side of the slit to the other, as indicated at 14, so that visible on the outer side is a flat or substantially flat helical path extending from the bottom edge of the slit 13 to the upper edge thereof. The metal at the center and designated at 15 remains integral with the protuberance 10 except for the slit opening. Thus at the conclusion of this step the radial slit is formed in the protuberance and the metal is flattened and at the same time shaped into helical fashion. However the angularity or slope of the walls is substantially unchanged and remains constant throughout its circumference. The base of course remains circular and, as above indicated, the helical surface does not commence until a short distance above the surface of the panel 11, the actual distance or spacing of the bottom end of the slit relative to the surface of the panel being approximately one half of the height of the protuberance.

In the final step, the hole 16 is punched centrally of the fastener and thus removing the metal in that region. This removes the metal on the inner side of the helical coined path, such as generally indicated at 15. This hole in top plan is round and the punching operation completely removes in circular fashion all metal between the high and low sides of the helix from one side of the slit 13 to the other side.

A feature of the method resides in its extreme simplicity requiring only three steps to produce the fastener. An important advantage is that the hole in the fastener is always a round one and of a predetermined size so as properly to receive a screw and engage same close to the root thereof. Thus when the screw is tightened the metal surrounding the hole 16 can be forced into intimate locking engagement with the screw. The coining step makes possible the use of sheet metal which is thicker than the screw for which it is intended, thereby enhancing the strength and torque of the fastener. In this instance the coining operation does not in any way effect the roundness of the hole because the latter is punched after coining has taken place.

The fastener produced by the above method has greater strength and resistance to torque because of the inclined walled circular base disposed below the radial slit 13 which enhances the strut effect as to the fastener wall by affording a greater length thereto. This is found to provide a fastener which has appreciably greater strength and torsional resistance than in the case where the fastener itself rises directly from the normal plane of the sheet.

Although the invention has been described with respect to sheet metal, it is to be understood that other sheet materials may be used to advantage, such as certain non-metallic plastics. Changes in details may be effected without departing from the spirit of the invention especially as defined in the appended claim.

What I claim is:

1. A sheet metal screw-receiving fastener comprising a flat sheet metal piece, a frusto-conical protuberance rising from said piece, a circular base for said protuberance, said protuberance being imperforate and unbroken except for a radial slit extending from the top of said protuberance to a point spaced approximately midway of the height of the protuberance and a hole in the central portion of the protuberance, the material surrounding said hole being thinner from the edge of the hole to the bottom of the slit than the material at the base of the protuberance and providing a flattened helical path extending from one side of the slit to the other, the upper end of said path terminating at the top of the protuberance, whereby the strut effect of the fastener is increased and due to the flattened helical path heavier gauge metal may be used for the piece and for forming the protuberance than would normally be employed for a particular screw.

References Cited

UNITED STATES PATENTS

| | | | |
|---|---|---|---|
| 2,156,002 | 4/1939 | Tinnerman | 85—32 |
| 2,396,588 | 3/1946 | Luce | 85—32 |
| 2,777,495 | 1/1957 | Pavlinetz | 85—32 |
| 3,219,087 | 11/1965 | Zahodinkin | 151—41.75 |

MARION PARSONS, JR., *Primary Examiner.*